US011079160B2

(12) United States Patent
Vijayan et al.

(10) Patent No.: US 11,079,160 B2
(45) Date of Patent: Aug. 3, 2021

(54) REFRIGERATOR APPLIANCES HAVING MULTIPLE FLUIDLY-CONNECTED, CHILLED CHAMBERS

(71) Applicant: Haier US Appliance Solutions, Inc., Wilmington, DE (US)

(72) Inventors: Vineeth Vijayan, Louisville, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 61 days.

(21) Appl. No.: 16/547,939

(22) Filed: Aug. 22, 2019

(65) Prior Publication Data

US 2021/0055032 A1 Feb. 25, 2021

(51) Int. Cl.
*F25D 17/06* (2006.01)
*F25D 11/02* (2006.01)
*F25D 17/08* (2006.01)

(52) U.S. Cl.
CPC ............ *F25D 17/065* (2013.01); *F25D 11/02* (2013.01); *F25D 17/067* (2013.01); *F25D 17/08* (2013.01); *F25D 2317/063* (2013.01); *F25D 2317/0671* (2013.01); *F25D 2317/0672* (2013.01); *F25D 2317/0682* (2013.01)

(58) Field of Classification Search
CPC ........ F25D 17/065; F25D 11/02; F25D 17/08; F25D 17/067; F25D 2317/063; F25D 2317/0671; F25D 2317/0672; F25D 2317/0682
USPC .......................................................... 62/186
See application file for complete search history.

(56) References Cited

U.S. PATENT DOCUMENTS

| 5,899,083 A | 5/1999 | Peterson et al. |
| 2013/0160473 A1 | 6/2013 | Hu et al. |
| 2013/0205809 A1* | 8/2013 | Beni ...................... F25D 11/02 62/62 |

* cited by examiner

*Primary Examiner* — Ana M Vazquez
(74) *Attorney, Agent, or Firm* — Dority & Manning, P.A.

(57) ABSTRACT

A refrigerator appliance, as provided herein, may include a cabinet, a first liner, a second liner, a first fan, a second fan, and a return line. The cabinet may define an evaporator chamber. The first liner may be attached to the cabinet and may define a first chilled chamber having a primary air inlet, a secondary air inlet, and an air outlet. The second liner may be attached to the cabinet and may define a second chilled chamber spaced apart from the first chilled chamber, the second chilled chamber having an air inlet and an air outlet. The return line may extend in fluid communication from the air outlet of the second chilled chamber to the secondary air inlet of the first chilled chamber.

17 Claims, 4 Drawing Sheets

REFRIGERATOR APPLIANCES HAVING MULTIPLE FLUIDLY-CONNECTED, CHILLED CHAMBERS

FIELD OF THE INVENTION

The present subject matter relates generally to refrigerator appliances and more particularly to refrigerator appliances having multiple chilled chambers that can selectively exchange chilled air through a common evaporator chamber.

BACKGROUND OF THE INVENTION

Certain refrigerator appliances utilize sealed systems for cooling chilled chambers of the refrigerator appliances. A typical sealed system includes an evaporator and a fan, the fan generating a flow of air across the evaporator and cooling the flow of air. The cooled air is then provided through an opening into the chilled chamber to maintain the chilled chamber at a desired temperature. Air from the chilled chamber is circulated back through a return duct to be re-cooled by the sealed system during operation of the refrigerator appliance, maintaining the chilled chamber at the desired temperature.

In some instances, it may be useful to provide multiple chilled chambers that can be cooled by air from a common cooling source. For example, an evaporator may be provided in fluid communication with two separate chambers. Such a configuration may be more efficient or economical than, for instance, having a separate cooling source or evaporator at each chilled chamber. Difficulties may arise, however, if a user wishes to maintain the two chambers at different temperatures. Additionally or alternatively, the cooling needs may vary between the chambers. Thus, it may be desirable to drive air from the common cooling source separately. In other words, air may need to be driven from the common cooling source to one chamber at certain times without driving air to the other chamber. Since the chambers share a common cooling source, though, it can be difficult to ensure that the air flowing to one chamber does not also generate a positive or negative pressure airflow through the other chamber.

Some existing refrigerator appliances have attempted to address such issues by providing one or more movable dampers between the chambers. Specifically, dampers can be closed/opened to seal/unseal the separate chambers. Such configurations may create further problems and expenses by increasing the complexity and needed parts for a refrigerator appliance. Along with the dampers themselves, individual heaters may be further necessary to prevent the dampers from freezing (e.g., freezing shut).

As a result, further improvements to refrigerator appliances are needed. In particular, it would be useful to provide a refrigerator appliance having multiple chilled chambers that can be selectively and separately cooled without needing one or more dampers to control air movement between the chambers.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a first liner, a second liner, a first fan, a second fan, and a return line. The cabinet may define an evaporator chamber. The first liner may be attached to the cabinet and may define a first chilled chamber having a primary air inlet, a secondary air inlet, and an air outlet. The second liner may be attached to the cabinet and may define a second chilled chamber spaced apart from the first chilled chamber, the second chilled chamber having an air inlet and an air outlet. The first fan may be in fluid communication with the evaporator chamber and the first chilled chamber. The second fan may be in fluid communication with the evaporator chamber and the second chilled chamber. The return line may extend in fluid communication from the air outlet of the second chilled chamber to the secondary air inlet of the first chilled chamber.

In another exemplary aspect of the present disclosure, a refrigerator appliance is provided. The refrigerator appliance may include a cabinet, a first liner, a second liner, a first fan, a second fan, a return line, and a controller. The cabinet may define an evaporator chamber. The first liner may be attached to the cabinet and may define a first chilled chamber having a primary air inlet, a secondary air inlet, and an air outlet. The second liner may be attached to the cabinet and may define a second chilled chamber spaced apart from the first chilled chamber, the second chilled chamber having an air inlet and an air outlet. The first fan may be in fluid communication with the evaporator chamber and the first chilled chamber. The second fan may be in fluid communication with the evaporator chamber and the second chilled chamber. The return line may extend in fluid communication from the air outlet of the second chilled chamber to the secondary air inlet of the first chilled chamber. The return line may be unobstructed from the second chilled chamber to the first chilled chamber. The controller may be in operative communication with the first fan and the second fan. The controller may be configured to initiate a single-chamber cooling operation. The single-chamber cooling operation may include activating the first fan to motivate a first-fan (FF) cooling airflow from the evaporator chamber to the first chilled chamber. The single-chamber cooling operation may further include activating the second fan to generate a second-fan (SF) positive stagnation pressure from the evaporator chamber, through the second chilled chamber, and to the secondary air inlet of the first chilled chamber. The SF positive stagnation pressure may prevent an airflow through the return line.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
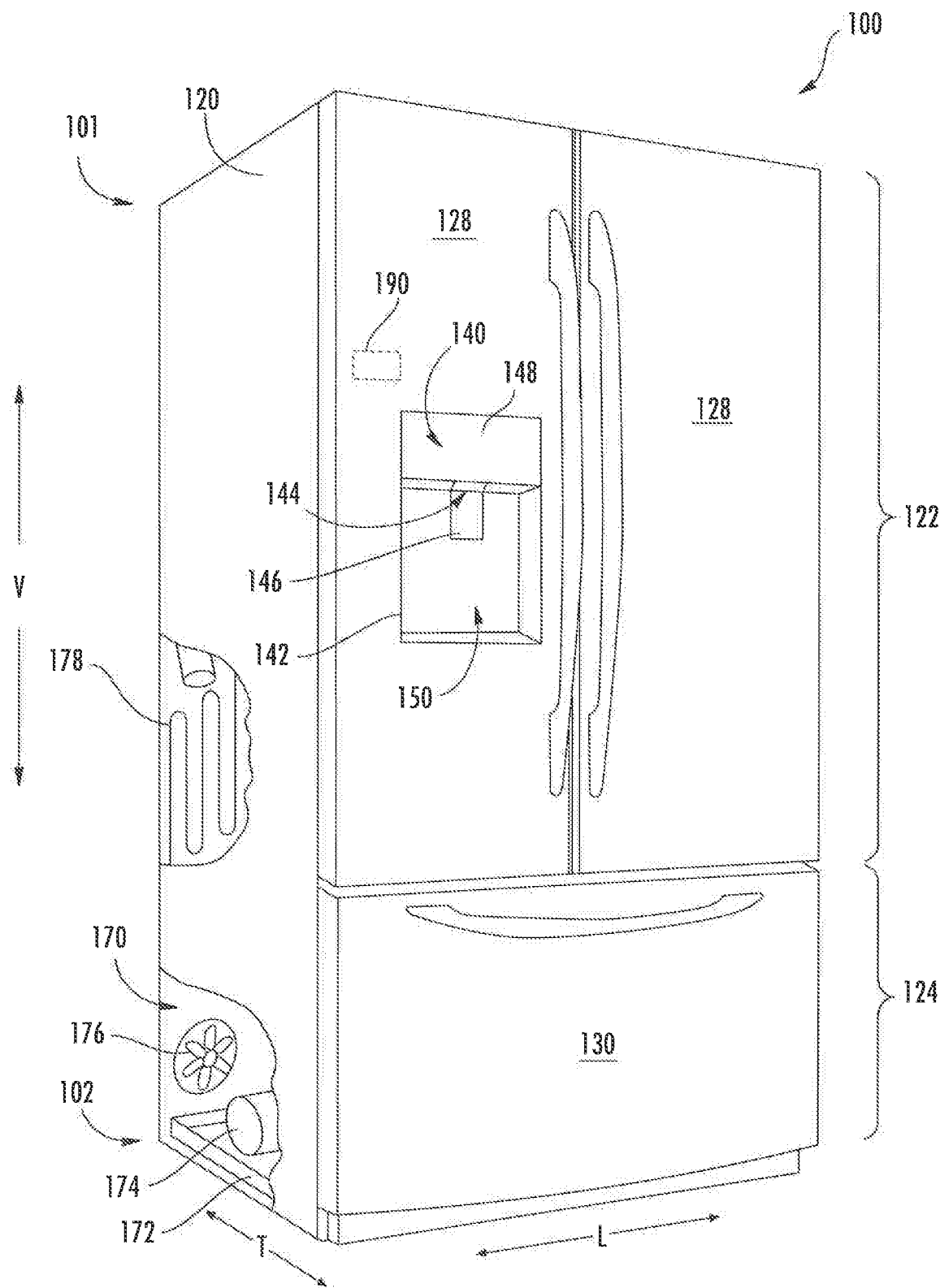
FIG. 1 provides a perspective view of a refrigerator appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow (e.g., airflow or refrigerant flow) in a fluid pathway. For example, "upstream" refers to the flow direction from which the fluid flows, and "downstream" refers to the flow direction to which the fluid flows.

Turning now to the figures, FIG. 1 provide perspective views of a refrigerator appliance (e.g., refrigerator appliance 100) according to exemplary embodiments of the present disclosure. Generally, refrigerator appliance 100 includes a cabinet or housing 120 that extends between a top portion 101 and a bottom portion 102 along a vertical direction V. Moreover, refrigerator appliance 100 defines multiple chilled chambers, such as for the receipt of food items for storage. For instance, one or more internal liners 112 are attached (e.g., fixedly attached) within housing 120 to define one or more discrete chilled chambers. In some embodiments, a liner 112 defines a fresh food chamber 122 positioned at or adjacent top portion 101 of housing 120, while a liner 112 (e.g., separate from or continuous with liner 112) defines a freezer chamber 124 arranged at or adjacent bottom portion 102 of housing 120. As such, refrigerator appliance 100 is generally referred to as a bottom mount refrigerator.

It is recognized, however, that the benefits of the present disclosure apply to other types and styles of refrigerator appliances such as, for example, a top mount refrigerator appliance, a side-by-side style refrigerator appliance or a standalone ice-maker appliance. Consequently, the description set forth herein is for illustrative purposes only and is not intended to be limiting in any aspect to any particular refrigerator chamber configuration.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in a closed configuration in FIG. 1.

In some embodiments, various storage components are mounted within fresh food chamber 122 to facilitate storage of food items therein, as will be understood art. In particular, the storage components include storage bins 182, drawers 184, and shelves 186 that are mounted within fresh food chamber 122. Storage bins 182, drawers 184, and shelves 186 are configured for receipt of food items (e.g., beverages or solid food items) and may assist with organizing such food items. As an example, drawers 184 can receive fresh food items (e.g., vegetables, fruits, or cheeses) and increase the useful life of such fresh food items.

In some embodiments, refrigerator appliance 100 also includes a dispensing assembly 140 for dispensing liquid water or ice. Dispensing assembly 140 includes a dispenser 142, for example, positioned on or mounted to an exterior portion of refrigerator appliance 100 (e.g., on one of doors 128). Dispenser 142 includes a discharging outlet 144 for accessing ice and liquid water. An actuating mechanism 146, shown as a paddle, is mounted below discharging outlet 144 for operating dispenser 142. In alternative exemplary embodiments, any suitable actuating mechanism may be used to operate dispenser 142. For example, dispenser 142 can include a sensor (such as an ultrasonic sensor) or a button rather than the paddle. A user interface panel 148 is provided for controlling the mode of operation. For example, user interface panel 148 includes a plurality of user inputs (not labeled), such as a water dispensing button and an ice-dispensing button, for selecting a desired mode of operation such as crushed or non-crushed ice.

Discharging outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open doors 128. In the exemplary embodiment, dispenser recess 150 is positioned at a level that approximates the chest level of a user.

In exemplary embodiments, a secondary liner 114 is attached to cabinet 120 (e.g., by being mounted or fixed to door 128) and defines another chamber (e.g., sub-compartment 162) for the receipt or storage of one or more chilled items. For instance, in some embodiments, at least one door 128 includes secondary liner 114 positioned thereon. In turn, sub-compartment 162 may be defined within one of doors 128. In some such embodiments, sub-compartment 162 extends into fresh food chamber 122 when refrigerator door 128 is in the closed position. Although sub-compartment 162 is generally shown as being attached to refrigerator door 128, additional or alterative embodiments may include a sub-compartment defined at another portion of refrigerator appliance 100 (e.g., at a fixed location within fresh food chamber 122).

In some embodiments, an icemaker or ice making assembly 160 and an ice storage bin 164 are positioned or disposed within sub-compartment 162. For instance, ice making assembly 160 may be positioned, at least in part, above ice storage bin 164. During use, ice is supplied to dispenser recess 150 (FIG. 1) from the ice making assembly 160 or ice storage bin 164 in sub-compartment 162 on a back side of refrigerator door 128.

In optional embodiments, an access door 166 is hinged to refrigerator door 128. Access door 166 may permit selective access to sub-compartment 162. Any manner of suitable latch 168 is configured with sub-compartment 162 to maintain access door 166 in a closed position. As an example, latch 168 may be actuated by a user in order to open access door 166 for providing access into sub-compartment 162. Access door 166 can also assist with insulating sub-compartment 162 (e.g., by thermally isolating or insulating sub-compartment 162 from fresh food chamber 122).

In additional or alternative embodiments, liquid water generated during melting of ice cubes in ice storage bin 164, is directed out of ice storage bin 164. For example, turning back to FIG. 1, liquid water from melted ice cubes may be directed to an evaporation pan 172. Evaporation pan 172 is positioned within a mechanical compartment 170 defined by housing 120 (e.g., at bottom portion 102 of housing 120). A condenser 174 of the sealed system can be positioned above (e.g., directly above) and adjacent to evaporation pan 172. Heat from condenser 174 can assist with evaporation of liquid water in evaporation pan 172. An evaporation fan 176 configured for cooling condenser 174 can also direct a flow air across or into evaporation pan 172. Thus, evaporation fan 176 can be positioned above and adjacent evaporation pan 172. Evaporation pan 172 is sized and shaped for facilitating evaporation of liquid water therein. For example, evaporation pan 172 may be open topped and extend across about a width or a depth of housing 120.

In some embodiments, chilled air from a sealed system 171 (FIG. 3) of refrigerator appliance 100 may be directed through or to components within sub-compartment 162 (e.g., ice making assembly 160 or storage bin 164 assembly). For instance, sub-compartment 162 may exchange cooling air with a chilled air supply duct 165 and a chilled air return duct 167 disposed on a side portion of cabinet 120 of refrigerator appliance 100, as will be further described below. In this manner, the supply duct 165 and return duct 167 may recirculate chilled air from a suitable sealed cooling system 171 through sub-compartment 162. An air handler or fan (e.g., fan 234—FIG. 4) may be provided to motivate and recirculate air. As an example, the fan can direct chilled air from an evaporator 178 (e.g., that is mounted within an evaporator chamber 220 adjacent to or within food chamber 122 or freezer chamber 124) of a sealed system 171 through supply duct 165 to sub-compartment 162.

Figure 3:
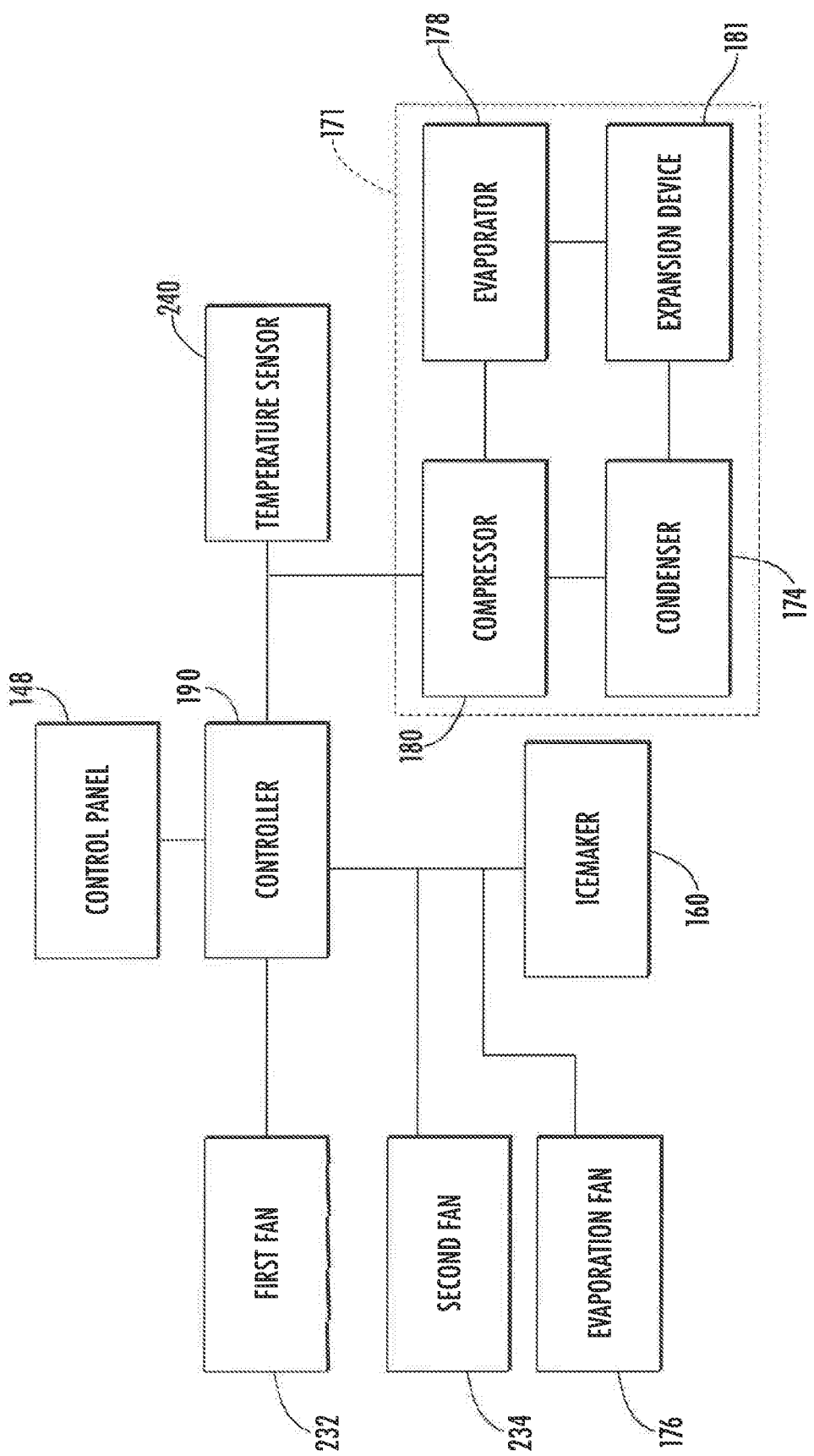
FIG. 3 provides a schematic view of various components of the exemplary refrigerator appliance shown in FIG. 1.

FIG. 3 provides a schematic view of certain components of refrigerator appliance 100. As may be seen in FIG. 3, refrigerator appliance 100 includes a sealed cooling system 171 for executing a vapor compression cycle for cooling air within refrigerator appliance 100 (e.g., within fresh food chamber 122, freezer chamber 124, and sub-compartment 162). Sealed cooling system 171 includes a compressor 180, a condenser 174, an expansion device 181, and an evaporator 178 connected in fluid series and charged with a refrigerant. As will be understood by those skilled in the art, sealed cooling system 171 may include additional components (e.g., at least one additional evaporator, compressor, expansion device, or condenser). As an example, sealed cooling system 171 may include two evaporators.

Within sealed cooling system 171, gaseous refrigerant flows into compressor 180, which operates to increase the pressure of the refrigerant. This compression of the refrigerant raises its temperature, which is lowered by passing the gaseous refrigerant through condenser 174. Within condenser 174, heat exchange with ambient air takes place so as to cool the refrigerant and cause the refrigerant to condense to a liquid state.

Expansion device 181 (e.g., a valve, capillary tube, or other restriction device) receives liquid refrigerant from condenser 174. From expansion device 181, the liquid refrigerant enters evaporator 178. Upon exiting expansion device 181 and entering evaporator 178, the liquid refrigerant drops in pressure and vaporizes. Due to the pressure drop and phase change of the refrigerant, evaporator 178 is cool relative to fresh food and freezer chambers 122 and 124 of refrigerator appliance 100. As such, cooled air is produced and refrigerates fresh food and freezer chambers 122 and 124 of refrigerator appliance 100. Thus, evaporator 178 is a heat exchanger which transfers heat from air passing over evaporator 178 to refrigerant flowing through evaporator 178.

Refrigerator appliance 100 also includes a pair of air handlers (e.g., first fan 232 and a second fan 234). Generally, first fan 232 is operable to urge a flow of chilled air from the evaporator chamber 220 to the freezer chamber 124. Second fan 234 is operable to urge another flow of chilled air from the evaporator chamber 220 to the sub-compartment 162 (e.g., via supply duct 165—FIG. 2) before flowing to the freezer chamber 124 (e.g., via return duct 167). The air handlers 232, 234 can be any suitable device for moving air. For example, air handlers 232, 234 can each be an axial fan or a centrifugal fan.

Figure 2:
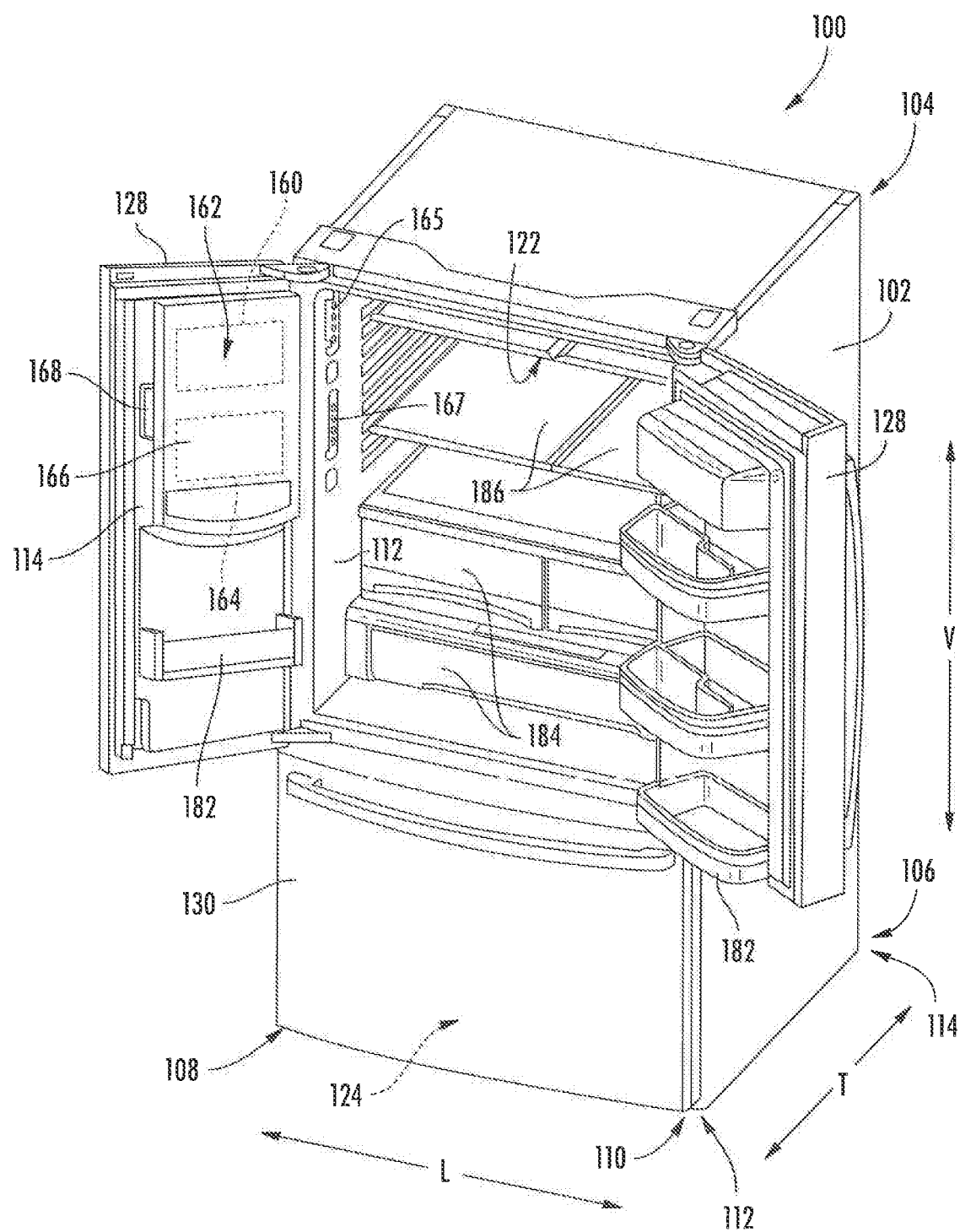
FIG. 2 provides a perspective view of the exemplary refrigerator appliance shown in FIG. 1, wherein a refrigerator door is in an open position.

Referring generally to FIGS. 1 through 3, operation of the refrigerator appliance 100 can be regulated by a controller 190 that is in operative communication with user interface panel 148 or various other components, as will be described below. User interface panel 148 provides selections for user manipulation of the operation of refrigerator appliance 100 such as, for example, selections between whole or crushed ice, chilled water, or other various options. In response to user manipulation of user interface panel 148 or one or more sensor signals, controller 190 may operate various components of the refrigerator appliance 100. Controller 190 may include a memory and one or more microprocessors, CPUs or the like, such as general or special purpose microprocessors operable to execute programming instructions or microcontrol code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 190 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 190 may be positioned in a variety of locations throughout refrigerator appliance 100. In the illustrated embodiment, controller 190 is located adjacent to the user interface panel 148. In other embodiments, the controller 190 may be positioned at any suitable location within refrigerator appliance 100, such as for example within a fresh food chamber, a freezer door, etc. Input/output ("I/O") signals may be routed between controller 190 and various operational components of refrigerator appliance 100. For example, user interface panel 148 may be in operable communication (e.g., electrical communication or wireless communication) with controller 190 via one or more signal lines or shared communication busses.

As illustrated, controller 190 may be in communication with the various components of dispensing assembly 140 and may control operation of the various components. For example, the various valves, switches, etc. may be actuatable based on commands from the controller 190. As discussed, interface panel 148 may additionally be in communication with the controller 190. Thus, the various operations may occur based on user input or automatically through controller 190 instruction.

In optional embodiments, controller 190 is further in operative communication with one or more temperature sensors 240. Temperature sensors 240 can be any suitable device for measuring the temperature of an atmosphere or ambient air within refrigerator appliance 100 (e.g., within sub-compartment 162, freezer chamber 124, fresh food chamber 122, etc.). For example, a temperature sensor 240 may include a thermistor or a thermocouple (e.g., mounted within sub-compartment 162, freezer chamber 124, fresh food chamber 122, etc.). Controller 190 can receive a signal, such as a voltage or a current, from a temperature sensor 240 that corresponds to the temperature of the air within a corresponding chamber. In such a manner, the temperature of one or more chilled chambers 222, 224 can be monitored or recorded with controller 190. Optionally, one or more of the fans 232, 234 may be in operative communication with controller 190 to be activated based a received temperature signal (e.g., indicating temperature within a corresponding temperature has reached or exceeded a set chamber temperature). For instance, controller 190 may be configured to automatically and selectively initiate a single-chamber cooling operation or a common-chamber cooling operation to chill one or multiple chilled chambers, respectively. In some embodiments, controller 190 is configured to selectively initiate one of at least the single-chamber cooling operation and the common-chamber cooling operation based on, for instance, a temperature detected (e.g., at temperature sensors 240) at within the chilled chambers 222, 224.

Figure 4:
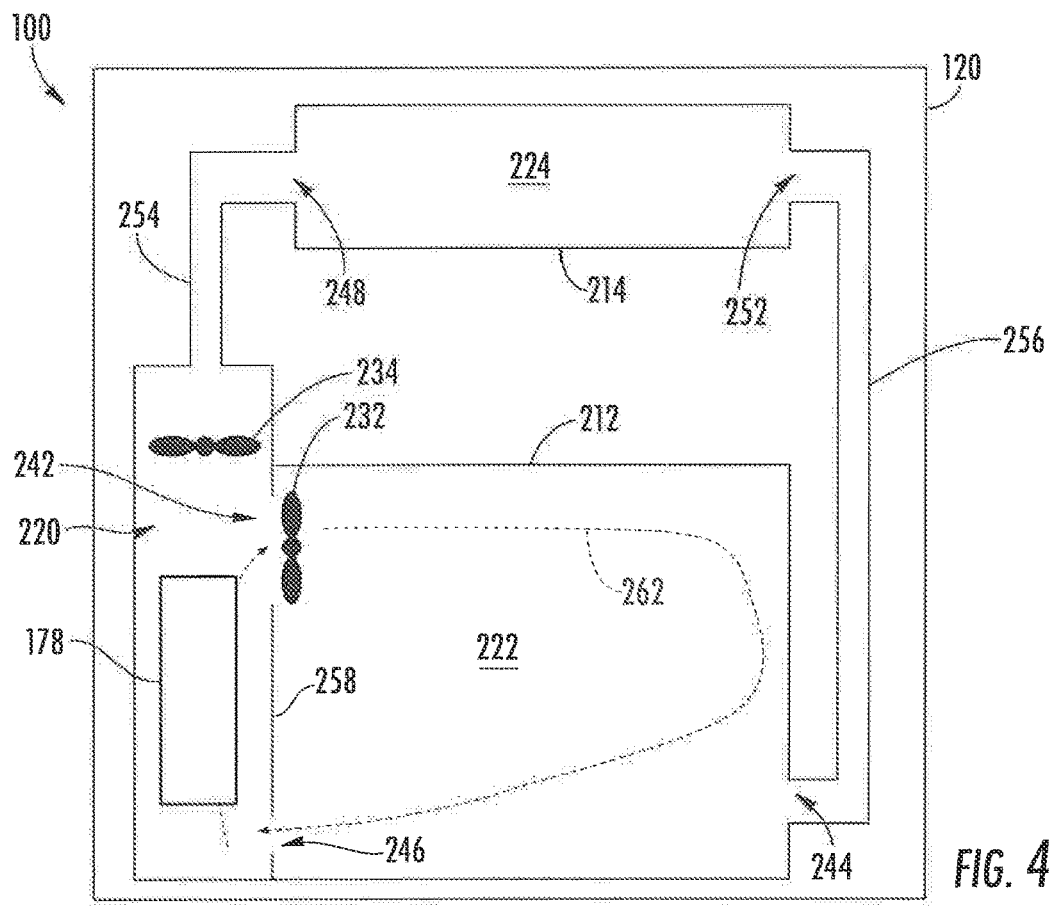
FIG. 4 provides a schematic view of a refrigerator appliance, illustrating a single-chamber cooling operation, according to exemplary embodiments of the present disclosure.
Figure 5:
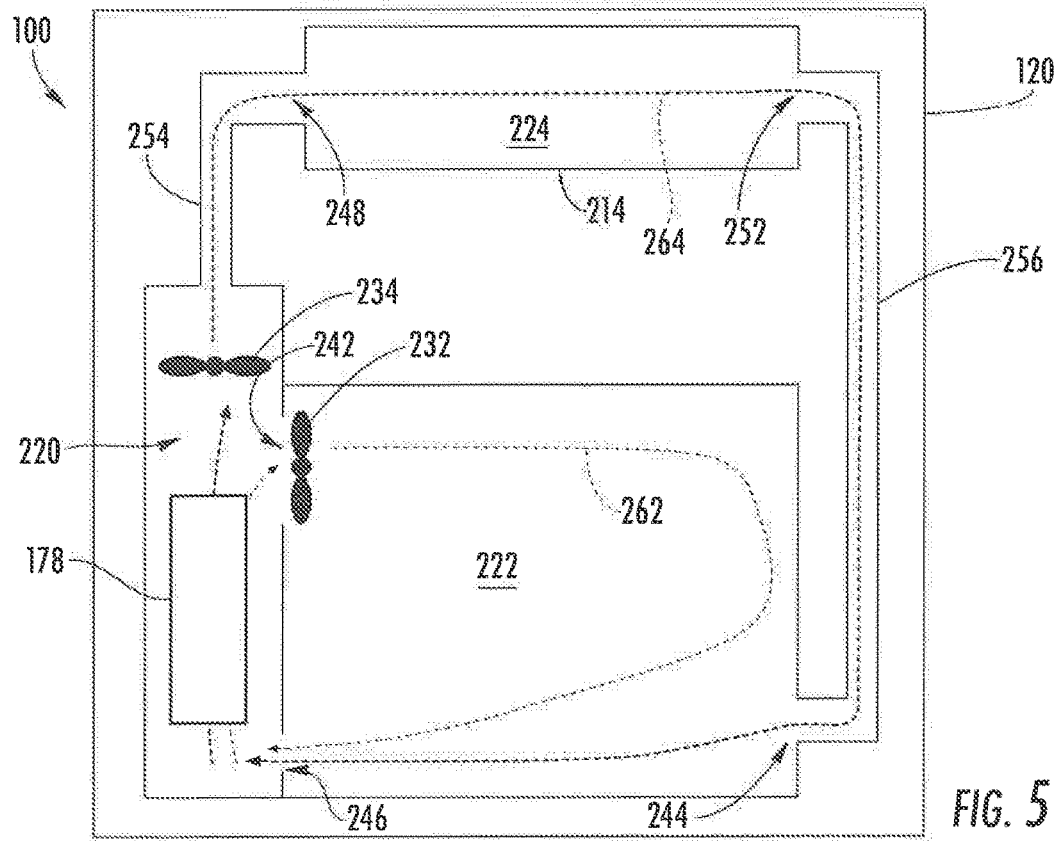
FIG. 5 provides a schematic view of a refrigerator appliance, illustrating a common-chamber cooling operation, according to exemplary embodiments of the present disclosure.

Turning especially to FIGS. 4 and 5, schematic views are provided of refrigerator appliance 100 operating in a single-chamber cooling operation (FIG. 4) and a common chamber cooling operation (FIG. 5) according to exemplary embodiments. As shown, refrigerator appliance 100 generally includes a cabinet 120 defining an evaporator chamber 220. In addition, refrigerator appliance 100 includes a first liner 212 and second liner 214 defining a discrete first chilled chamber 222 and second chilled chamber 224, respectively. In some embodiments, first chilled chamber 222 includes or is provided as a freezer chamber 124 (e.g., defined by liner 112), as described above. In additional or alternative embodiments, second chilled chamber 224 includes or is provided as sub-compartment 162 (e.g., defined by liner 114), as described above. Both the first liner 212 and the second liner 214 are attached to the cabinet 120 (e.g., directly or, alternatively, indirectly; such as through a refrigerator door 128—FIG. 2). As an example, the first liner 212 may be directly attached to and enclosed within the cabinet 120 (i.e., at a fixed location relative to cabinet 120), while the second liner 214 is directly attached or mounted to a refrigerator door 128, which is itself rotatably attached to the cabinet 120. Thus, the second liner 214 may rotate with the door 128. As an alternative example, both the first liner 212 may and the second liner 214 may be directly attached to and enclosed within the cabinet 120 (i.e., at separate fixed locations relative to cabinet 120). Optionally, the second liner 214 and second chilled chamber 224 may be positioned above the first chilled chamber 222.

As shown, first chilled chamber 222 is arranged in fluid communication with evaporator chamber 220. Specifically, first chilled chamber 222 can exchange air with the evaporator chamber 220 (and the evaporator 178 mounted therein) to selectively cool the air within first chilled chamber 222. To facilitate air exchange, first chilled chamber 222 has a primary air inlet 242, a secondary air inlet 244, and an air outlet 246.

In some embodiments, the primary air inlet 242 fluidly connects (e.g., directly connects) the first chilled chamber 222 and the evaporator chamber 220. The primary air inlet 242 may be downstream from the evaporator chamber 220 and upstream from the first chilled chamber 222. In additional or alternative embodiments, the air outlet 246 of the first chilled chamber 222 further fluidly connects (e.g., directly connects) the first chilled chamber 222 and the evaporator chamber 220. The air outlet 246 may be downstream from the first chilled chamber 222 and upstream from the evaporator chamber 220. In further additional or alternative embodiments, the secondary air inlet 244 of the first chilled chamber 222 may be spaced apart from the primary air inlet 242 and the air outlet 246. In some such embodiments, the secondary air inlet 244 only indirectly connects the evaporator chamber 220 to the first chilled chamber 222 (e.g., through the second chilled chamber 224 or a return line 256). The secondary air inlet 244 of the first chilled chamber 222 may be upstream from the first chilled chamber 222 and in selective downstream fluid communication with the evaporator chamber 220.

Optionally, evaporator chamber 220 may be positioned at a common height or in a larger enclosure that houses both the evaporator 178 and the first chilled chamber 222 within the cabinet 120. The primary air inlet 242 and the air outlet 246 may be defined through a common intermediate wall 258 separating or delineating the evaporator chamber 220 from the first chilled chamber 222. The secondary air inlet 244 may be defined through a different wall and further spaced apart from the primary air inlet 242 and the air outlet 246 (e.g., along the lateral direction or the transverse direction).

As shown, second chilled chamber 224 is further arranged in fluid communication with evaporator chamber 220. In particular, second chilled chamber 224 can exchange air with the evaporator chamber 220 (and evaporator 178 mounted therein) to selectively cool the air within second chilled chamber 224. Thus, evaporator chamber 220 is a common cooling chamber selectively exchanging and mixing air between the first chilled chamber 222 and the second chilled chamber 224.

In some embodiments, the air inlet 248 fluidly connects the second chilled chamber 224 and the evaporator chamber 220. For instance, an intake line 254 (e.g., including or provided as supply duct 165—FIG. 2) fluidly connects evaporator chamber 220 to the air inlet 248 of the second chilled chamber 224. The air inlet 248 may be downstream from the evaporator chamber 220 (and intake line 254) and upstream from the second chilled chamber 224. In additional or alternative embodiments, the air outlet 252 of the second chilled chamber 224 further fluidly connects the second chilled chamber 224 and the first chilled chamber 222. In particular, a return line 256 (e.g., including or provided as return duct 167—FIG. 2) extends in fluid communication from the air outlet 252 of the second chilled chamber 224 to the secondary air inlet 244 of the first chilled chamber 222. Thus, air from the second chilled chamber 224 may be selectively directed to the first chilled chamber 222 (and subsequently returned to the evaporator chamber 220) by passing through the return line 256.

In certain embodiments, the return line 256 is unobstructed from the second chilled chamber 224 to the first chilled chamber 222. No portion of the return line 256 is selectively blocked or closed (e.g., by a damper). Thus, the return line 256 remains open and is physically unrestricted by any solid member along the fluid path between the chilled chambers 222, 224 (e.g., when all refrigerator doors 128 are in the closed position). No moving part is provided to close or block the air outlet 252 of the second chilled chamber 224 and the secondary air inlet 244 of the first chilled chamber 222.

In further embodiments, fluid communication between the evaporator 178, first chilled chamber 222, second chilled chamber 224, and return line 256 is unobstructed and free of any movable damper. Thus, along with the return line 256 being unobstructed, as described above, the primary air inlet 242 and air outlet 246 of the first chilled chamber 222 may be unobstructed such that both remain open and physically unrestricted by any solid member along the fluid path between the first chilled chamber 222 and the evaporator chamber 220. Moreover, the air inlet 248 of the second chilled chamber 224 and intake line 254 may be unobstructed such that both remain open and physically unrestricted by any solid member along the fluid path between the evaporator chamber 220 and the second chilled chamber 224. For the evaporator chamber 220, the first chilled chamber 222, the second chilled chamber 224, and the return line 256, there may be no moving part to close or block the primary air inlet 242, the secondary air inlet 244, the air outlet 246, the air inlet 248, and the air outlet 252.

As shown, multiple fans 232, 234 are provided in fluid communication with the evaporator chamber 220 (e.g., to selectively control or direct the flow of air to/from the chilled chambers 222, 224). Specifically, a first fan 232 is in fluid communication with the evaporator chamber 220 and the first chilled chamber 222, while a second fan 234 is in fluid communication with the evaporator chamber 220 and the second chilled chamber 224. Generally, either fan 232 or 234 may be provided as a suitable air-motivating device in operative communication with the controller 190. For instance, either fan 232 or 234 may be provided as an axial or centrifugal fan to be selectively activated or rotated (e.g., as initiated or commanded by the controller 190).

In exemplary embodiments, the first fan 232 is directed at the primary air inlet 242. For instance, the first fan 232 may be positioned (e.g., physically and in fluid communication) between the evaporator chamber 220 and the first chilled chamber 222 to motivate an airflow (e.g., airflow 262) accordingly. In such embodiments, first chilled chamber 222 is a positive pressure chamber. Optionally, the first fan 232 is mounted within or proximate to primary air inlet 242.

In additional or alternative embodiments, the second fan 234 is directed at the air inlet 248 or intake line 254. For instance, the first fan 232 may be positioned (e.g., physically and in fluid communication) between the evaporator chamber 220 and the air inlet 248 or the intake line 254 to motivate an airflow (e.g., airflow 264) accordingly. In such embodiments, second chilled chamber 224 is a positive pressure chamber. Optionally, the second fan 234 is mounted within evaporator chamber 220.

Turning specifically to FIG. 4, an exemplary single-chamber cooling operation is illustrated. In particular, a first-fan (FF) cooling airflow 262 is initiated. Specifically, the first fan 232 is activated such that air is drawn from the evaporator chamber 220 and projected to the first chilled chamber 222 through the primary air inlet 242. For instance, the first fan 232 may be rotated at a FF rotation speed (e.g., first FF rotation speed provided as a predetermined rotations per minute of the first fan 232). Simultaneous to the FF cooling airflow 262, the second fan 234 is activated. The activation may be insufficient to generate an airflow to the second chilled chamber 224 from the common evaporator chamber 220, but sufficient to generate a second-fan (SF) positive stagnation pressure. For instance, the second fan 234 may be rotated at a SF rotation speed (e.g., first SF rotation speed provided as a predetermined rotations per minute of the second fan 234). The first SF rotation speed may be tuned according to the first FF rotation speed, such that the SF positive pressure matches the pressure within the first chilled chamber 222 without overcoming the negative pressure generated by the first FF rotation speed. Although the SF positive stagnation pressure is insufficient to force air from the evaporator chamber 220 to the second chilled chamber 224 against the negative pressure generated within the evaporator chamber 220 by the first fan 232, the second chilled chamber 224 and return line 256 may be positively pressured. Air within the second chilled chamber 224 may be contained therein. Moreover, a backflow (e.g., through the return line 256) from the first chilled chamber 222 to the second chilled chamber 224 (and then to the evaporator chamber 220) is prevented. Notably, such a backflow would otherwise be generated by the disparity in pressure between first chilled chamber 222 and the second chilled chamber 224. Advantageously, the FF cooling airflow 262 may continue to cool the first chilled chamber 222 without influencing the temperature within the second chilled chamber 224 or requiring any portion of the flow path through the second chilled chamber 224 from the evaporator chamber 220 to the secondary air inlet 244 to be blocked (e.g., by a solid damper).

Turning specifically to FIG. 5, an exemplary common-chamber cooling operation is illustrated. In particular, FF cooling airflow 262 is initiated. Specifically, the first fan 232 is activated such that air is drawn from the evaporator chamber 220 and projected to the first chilled chamber 222 through the primary air inlet 242. For instance, the first fan 232 may be rotated at a FF rotation speed (e.g., second FF rotation speed provided as a predetermined rotations per minute of the first fan 232). Simultaneous to the FF cooling airflow 262, a SF cooling airflow 264 is initiated. Specifically, the second fan 234 is activated such that air is drawn from the evaporator chamber 220 and projected to the second chilled chamber 224 through the air inlet 248. For instance, the second fan 234 may be rotated at a SF rotation speed (e.g., second SF rotation speed provided as a predetermined rotations per minute of the second fan 234). Generally, the second SF rotation speed is greater than the first SF rotation speed. The second SF rotation speed may be tuned according to the second FF rotation speed, such that the SF airflow 264 is initiated in spite of the negative pressure generated by the second FF rotation speed. Air may thus be forced downstream to the first chilled chamber 222 and the second chilled chamber 224 in parallel before being returned to the evaporator chamber 220 through the first chilled chamber 222 and air outlet 246. Advantageously, the FF cooling airflow 262 and SF cooling airflow 264 may simultaneously cool the first chilled chamber 222 and the second chilled chamber 224, respectively, using a common evaporator 178 and evaporator chamber 220.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining an evaporator chamber;
   a first liner attached to the cabinet and defining a first chilled chamber having a primary air inlet, a secondary air inlet, and an air outlet;
   a second liner attached to the cabinet and defining a second chilled chamber spaced apart from the first chilled chamber, the second chilled chamber having an air inlet and an air outlet;
   a first fan in fluid communication with the evaporator chamber and the first chilled chamber;
   a second fan in fluid communication with the evaporator chamber and the second chilled chamber;
   a return line extending in fluid communication from the air outlet of the second chilled chamber to the secondary air inlet of the first chilled chamber; and
   a controller in operative communication with the first fan and the second fan, the controller being configured to initiate a single-chamber cooling operation, the single-chamber cooling operation comprising
      activating the second fan to generate a second-fan (SF) positive stagnation pressure from the evaporator chamber, through the second chilled chamber, and to the secondary air inlet of the first chilled chamber, the SF positive stagnation pressure preventing an airflow through the return line.

2. The refrigerator appliance of claim 1, wherein the return line is unobstructed from the second chilled chamber to the first chilled chamber.

3. The refrigerator appliance of claim 1, wherein fluid communication between the evaporator chamber, the first chilled chamber, the second chilled chamber, and the return line is unobstructed and free of any movable damper.

4. The refrigerator appliance of claim 1, further comprising a controller in operative communication with the first fan and the second fan, the controller being configured to initiate a common-chamber cooling operation, the common-chamber cooling operation comprising
   activating the first fan to motivate a first-fan (FF) cooling airflow from the evaporator chamber to the first chilled chamber, and
   activating the second fan to motivate a second-fan (SF) cooling airflow from the evaporator chamber to the second chilled chamber during motivation of the FF cooling airflow.

5. The refrigerator appliance of claim 1, wherein the air outlet of the first chilled chamber fluidly connects the first chilled chamber and the evaporator chamber.

6. The refrigerator appliance of claim 1, wherein the primary air inlet of the first chilled chamber fluidly connects the evaporator chamber and the first chilled chamber.

7. The refrigerator appliance of claim 1, wherein the evaporator chamber defines a mixing volume permitting communication from the fluid outlet of the first chilled chamber to the air inlet of the second chilled chamber.

8. The refrigerator appliance of claim 1, further comprising a door rotatably attached to the cabinet, wherein the second liner is mounted to the door to rotate therewith.

9. The refrigerator appliance of claim 1, wherein the second liner is mounted to the cabinet at a fixed location relative to the evaporator chamber.

10. A refrigerator appliance comprising:
    a cabinet defining an evaporator chamber;
    a first liner attached to the cabinet and defining a first chilled chamber having a primary air inlet, a secondary air inlet, and an air outlet;
    a second liner attached to the cabinet and defining a second chilled chamber spaced apart from the first chilled chamber, the second chilled chamber having an air inlet and an air outlet;
    a first fan in fluid communication with the evaporator chamber and the first chilled chamber;
    a second fan in fluid communication with the evaporator chamber and the second chilled chamber;
    a return line extending in fluid communication from the air outlet of the second chilled chamber to the secondary air inlet of the first chilled chamber, the return line being unobstructed from the second chilled chamber to the first chilled chamber; and
    a controller in operative communication with the first fan and the second fan, the controller being configured to initiate a single-chamber cooling operation, the single-chamber cooling operation comprising
       activating the first fan to motivate a first-fan (FF) cooling airflow from the evaporator chamber to the first chilled chamber, and
       activating the second fan to generate a second-fan (SF) positive stagnation pressure from the evaporator chamber, through the second chilled chamber, and to the secondary air inlet of the first chilled chamber, the SF positive stagnation pressure preventing an airflow through the return line.

11. The refrigerator appliance of claim 10, wherein fluid communication between the evaporator chamber, the first chilled chamber, the second chilled chamber, and the return line is unobstructed and free of any movable damper.

12. The refrigerator appliance of claim 10, wherein the controller is further configured to initiate a common-chamber cooling operation separate from the single-chamber cooling operation, the common-chamber cooling operation comprising
    activating the first fan to motivate a first-fan (FF) cooling airflow from the evaporator chamber to the first chilled chamber, and
    activating the second fan to motivate a second-fan (SF) cooling airflow from the evaporator chamber to the second chilled chamber during motivation of the FF cooling airflow.

13. The refrigerator appliance of claim 10, wherein the air outlet of the first chilled chamber fluidly connects the first chilled chamber and the evaporator chamber.

14. The refrigerator appliance of claim 10, wherein the primary air inlet of the first chilled chamber fluidly connects the evaporator chamber and the first chilled chamber.

15. The refrigerator appliance of claim 10, wherein the evaporator chamber defines a mixing volume permitting communication from the fluid outlet of the first chilled chamber to the air inlet of the second chilled chamber.

16. The refrigerator appliance of claim 10, further comprising a door rotatably attached to the cabinet, wherein the second liner is mounted to the door to rotate therewith.

17. The refrigerator appliance of claim 10, wherein the second liner is mounted to the cabinet at a fixed location relative to the evaporator chamber.

* * * * *